United States Patent [19]
Sokolow

[11] 3,837,248
[45] Sept. 24, 1974

[54] PARISON CUTOFF AND SEALING APPARATUS

[75] Inventor: Nickolas N. Sokolow, Roscoe, Ill.

[73] Assignee: Plasti-Mac, Inc., Longwood, Fla.

[22] Filed: Nov. 29, 1972

[21] Appl. No.: 310,248

[52] U.S. Cl. .................... 83/375, 83/623, 83/643
[51] Int. Cl. ............................................ B26d 5/12
[58] Field of Search ............. 83/643, 644, 646, 623, 83/375

[56] References Cited
UNITED STATES PATENTS

| | | | |
|---|---|---|---|
| 75,508 | 3/1868 | Allen | 83/643 X |
| 3,677,732 | 2/1971 | Dorman | 83/643 X |
| 3,774,478 | 11/1973 | Carpenter | 83/643 X |

Primary Examiner—J. M. Meister
Attorney, Agent, or Firm—Parmelee, Miller, Welsh & Kratz

[57] ABSTRACT

A parison cutoff and sealing device in which a pair of shearing members disposed on either side of a tubular thermoplastic extrusion are diagonally advanced toward each other in a plane substantially transverse to the tube axis thereby severing the parison through the application of shearing forces. The shearing members are maintained parallel to each other throughout their relative movement by a frame comprising four links pivotal connected to form a parallelogram. By squeezing the heated tubular extrusion between blunt shearing members, one of which carries a knife blade, the leading edge of the tube may be sealed as the parison is cut off.

9 Claims, 5 Drawing Figures

PATENTED SEP 24 1974  3,837,248

PARISON CUTOFF AND SEALING APPARATUS

BACKGROUND OF THE INVENTION

1. Field

This invention relates to the apparatus for severing and sealing heated tubular thermoplastic material and more particularly to such devices adapted for forming the parison used in blow-molding plastic articles.

2. Prior Art

In the blow-molding process of forming plastic articles, compressed air is introduced into a heated section of tubular thermoplastic material, or parison, causing the parison to expand until it conforms to the shape of the mold. The parisons are normally mass produced by cutting off sections of extruded tubular material and sealing one end.

Two basic types of devices were used in the prior art for severing the parison from the extruded tubular material. U.S. Pat. No. 2,928,120 discloses both types of cutoff devices. In the first type, a knife blade is drawn through the tubing along a line perpendicular to the knife edge and to the axis of the tubing. A second type of cutoff device is the scissors type in which the tubing is severed by the compression force as the blades advance toward each other. U.S. Pat. No. 3,635,632 discloses a similar scissor arrangement which additionally clamps or seals the leading edge of the tubing as the parison is cutoff.

The above types of cutoff devices have performed satisfactorily with the softer thermoplastics. However, polyolefin, polyethylene and polypropylene cannot be cut as easily. Polypropylene being stringy and viscous is particularly difficult to cut. Attempts to cleanly sever polypropylene parisons with the prior art devices have proved to be singularly unsuccessful. The addition of an electric heater in the cutting blade did not prove to be any more satisfactory.

SUMMARY OF THE INVENTION

According to the invention, a pair of elongated shear members are positioned on either side of a tubular thermoplastic extrusion in a plane generally transverse to the tube axis and with the elongated edges of said shear members substantially parallel to each other. At least one of said shear members is moved along a line substantially perpendicular to the tube axis but diagonal to the elongated edge of said one shear member while said shear members are advanced toward each other. Throughout their relative movement, the elongated edges of the shear members are maintained substantially parallel to each other. In this manner, at least the one shearing member is drawn across the tubing to apply a shearing or slicing force which more effectively cuts the tougher thermoplastic materials. This cutting action also results in cleaner cuts of the softer thermoplastic materials with the application of less force. A highly efficient cut is achieved by drawing the shear members diagonally in opposite directions as they are advanced toward each other.

Apparatus for advancing the shearing members toward each other in the above manner may include a frame comprising four links pivotally connected end to end to form an adjustable parallelogram, means for displacing first and second opposed corners of the parallelogram toward and away from each other with the parallelogram being divided into first and second halves along an axis through the first and second opposed corners, means for connecting a first one of the shear members to a first half of the parallelogram and means for connecting the second shear member to the second half of the parallelogram symetrically opposite the first shear member.

In the preferred embodiment of the invention, the first shear member is connected to a first link in the parallelogram and the second shear member is connected to the opposing link of the parallelogram. Thus as the opposed corners are displaced away from each other, the elongated edges of the shear members will remain parallel as they advance toward each other along paths which are diagonal to the elongated edges.

In another embodiment of the invention, the shear members are connected respectively to a first link in the associated half of the parallelogram by a fixed pivot and are connected to the second link in the associated half of the parallelogram by a sliding pivot. Preferably, the first links in each half of the parallelogram are adjacent each other and also preferably the sliding pivot comprises a fixed pivot on the associated second link and a slot in the associated shear member parallel to the elongated edge of the shear member for receiving the associated fixed pivot.

Either one or both of the shear members may include knife blades. However, in order to effect sealing of the leading end of the tubular extrusion of thermoplastic material, the elongated edges of the shear members may be blunted to apply a clamping force to the tubing and a cutting edge may be carried on one of the shear members adjacent the elongated blunt edge to effect the parison cut off.

BRIEF DESCRIPTION OF THE DRAWINGS

An understanding of the invention may be gained by reference to the following description when taken in conjuction with the accompanying drawings in which.

DESCRIPTION OF THE PREFERRED EMBODIMENT

Figure 1:
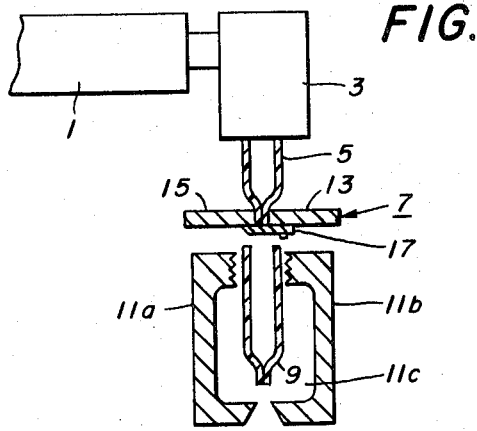
FIG. 1 is a simplified elevation view with parts in section and parts missing of blow-molding apparatus incorporating the invention.

Referring to FIG. 1, an extruder 1 forces heated thermoplastic material through an extruder head 3 to form a continuous tubing of thermoplastic material 5. The cutoff device indicated by the general reference character 7, which is the subject matter of this invention and will be more fully described hereinafter, severs the tubing 5 to form the parison 9. It will be noted that in severing the parison, the cutoff device 7 crimps the end of the tubing 5 so that the lower end of each parison as viewed in FIG. 1 is closed off. The parison is then inserted between the two halves 11a and 11b of the blow mold which close around the parison to form a cavity 11c having the desired shape of the article to be formed. Compressed air is then introduced into the open end of the parison 9 causing it to expand until it conforms to the shape defined by the cavity 11c in the blow mold. After the thermoplastic material has set, the two halves of the blow mold are opened and the finished article may be removed.

The cutoff device 7 illustrated in FIG. 1 includes shear members 13 and 15 and a knife 17 connected to the lower side of the shear member 13. The knife 17 overlaps the shear member 15 when the shear members 13 and 15 are brought close to one another. The shear members 13 and 15 are provided with blunt confronting edges which clamp the leading end of the tube 5 while the blade 17 is severing the parison 9. This clamped end of the tubing 5 becomes the sealed end of the next parison. Thus the cutoff device 7 simultaneously forms the closed end of one parison while the preceeding parison is being cut off.

Figure 2:
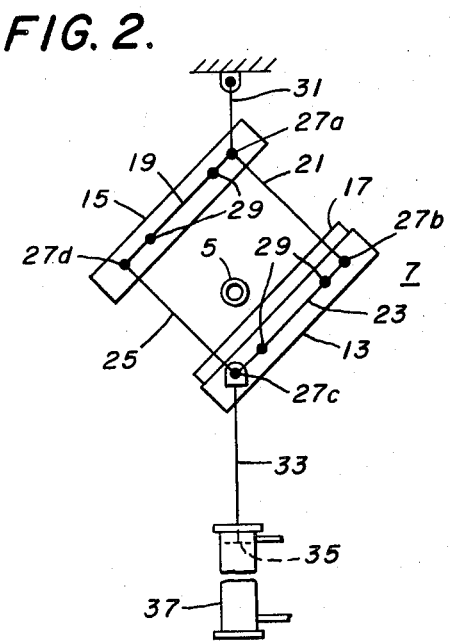
FIG. 2 is a diagramatic plan view of one embodiment of the invention illustrating the shear members in the open position.

FIG. 2 illustrates diagrammatically a plan view of the cutoff device 7 with the shear members 13 and 15 in their open position. The shear members 13 and 15 are supported and carried by a frame consisting of four links 19, 21, 23 and 25 which are pivotally connected end to end by pivots 27a–d to form an adjustable parallelogram. The shear members 13 and 15 are connected by suitable means 29 to opposing links 23 and 19 respectively. The pivot 27a is connected to a rigid support by a rod 31. The opposing pivot 27c is connected to the piston rod 33 which in turn is connected to the piston 35 of air cylinder 37. The shear members 13 and 15 are disposed on either side of the thermoplastic tubing 5 to be cut in a plane perpendicular to the tube axis.

Figure 3:
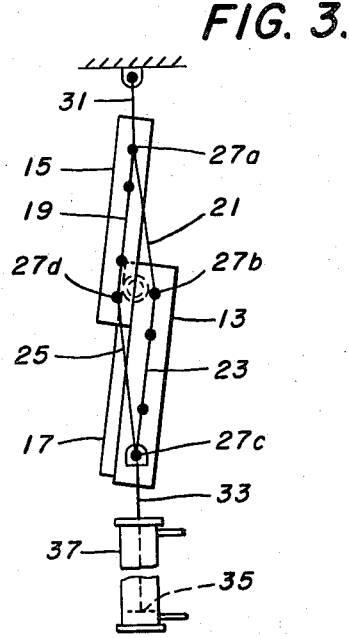
FIG. 3 is a diagramatic plan view of the device illustrated in FIG. 2 with the shear members in the closed position.

When compressed air is introduced into the air cylinder 37 above the piston 35, the piston rod 33 along with the pivot 27c is drawn downward until it reaches the position illustrated in FIG. 3. This motion causes the frame formed by the links 19, 21, 23 and 25 to elongate along an axis through the pivots 27a and 27c. The link 19 rotates about the pivot 27a thereby carrying the shear member 15 toward the shear member 13 and the tubing 5. The link 23 moves downward and inward as viewed in FIGS. 2 and 3 thereby carrying the shear member 13 in the same direction. Thus the shear member 13 and the blade 17 attached to it move toward and through the tubing 5 along a line perpendicular to the axis of the tubing and diagonal to the elongated cutting edge of the knife 17 and the shear member 13. The knife, therefore, applies a slicing or shearing force to the tubing as the edge of the knife is drawn along the tubing. This slicing action greatly improves the performance of the cutoff device in severing such difficult-to-cut thermoplastic materials such as polyolefin, polyethylene and especially polypropylene. Alternatively, knife blades may be attached to both of the shear members 13 and 15. The links 19 and 23 could be eliminated by pivotally connecting the shear members 13 and 15 directly to the links 21 and 25 to form the parallelogram, however, for ease in replacing the shear members it is preferable that the links 19 and 23 be provided.

Figure 4:
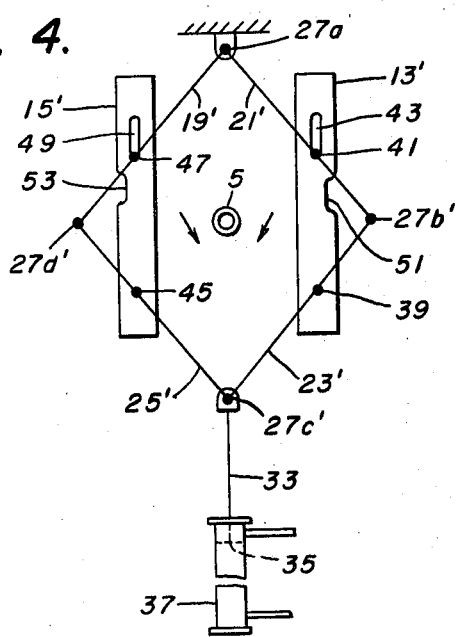
FIG. 4 is a diagramatic plan view of another embodiment of the invention with the shear members in the open position.
Figure 5:
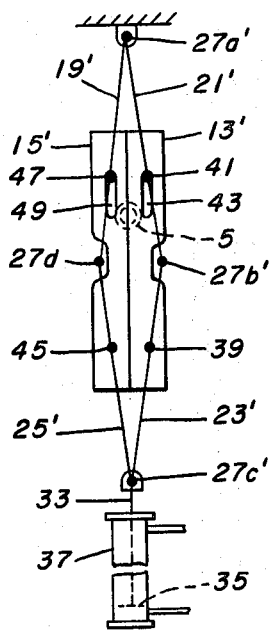
FIG. 5 is a diagramatic plan view of the device of FIG. 4 with the shear members in the closed position.

FIGS. 4 and 5 diagrammatically illustrate another embodiment of the invention in the open and closed positions respectively. In this configuration the links 19', 21', 23' and 25' are connected end to end by pivots 27a'–d' to form an adjustable parallelogram, however, the shear members 13' and 15' are each connected across two of the links in the parallelogram. Shear member 13' is pivotally connected to link 23' by pivot 39 and to link 21' by pivot 41 carried by the link 21' which moves in slot 43 in the shear member 13'. Similarily, the shear member 15' is pivotally connected to the link 25' by the pivot 45 and to the link 19' by the pivot 47 on link 19' which slides in slot 49 on the shear member 15'. When the pivot 27c' is drawn downward by the piston rod 33 connected to the piston 35 of air cylinder 37 while the pivot 27a' is held in a fixed position, the pivots 39 and 45 move downward and inward until they reach the position shown in FIG. 5. As the parallelogram formed by the links 19', 21', 23' and 25' elongates, the pivots 41 and 47 slide along the slots 43 and 49 in the shear member 13' and 15' respectively. As the shear members 13' and 15' advance toward each other from the position shown in FIG. 4 to the position shown in FIG. 5, they remain parallel to each other and move diagonally with respect to the tubing 5. By attaching knife blades to both shear member 13' and 15', a slicing or shearing force may be applied simultaneously to two sides of the tubing 5. Alternatively, the fixed pivots could be associated with the links 19' and 21' and the sliding pivots connected with the links 23' and 25', however, the maximum downward movement of the shear members as viewed in FIGS. 4 and 5, and therefore the maximum shearing forces, are achieved with the configuration illustrated. Still another alternative would be to have the fixed pivots associated with the respective shearing members connected to opposing links in the parallelogram rather than adjacent links.

In summary, an improved parison sealing and cutoff device has been disclosed which applies a slicing or shearing action to the tubing. This provides improved performance in cutting both soft and difficult to cut thermoplastic materials.

I claim as my invention:

1. Apparatus for severing heated tubular thermoplastic material transverse to the tube axis comprising:
 a pair of elongated shear members connected to each other and positioned on either side of the tube in a plane generally transverse to said tube axis with the elongated edges of said shear members being substantially parallel to each other,
 a single fixed pivotal support for said pair of shear members, and
 actuating means for moving at least one of said shear members relative to said single fixed pivotal support along a path diagonal to the elongated edge of said one shear member while advancing said shear members toward each other in said plane transverse to the axis of the tube, the elongated edges of said shear members being maintained substantially parallel to each other throughout their relative movement, whereby a shearing force is applied to said tubular thermoplastic material generally transverse to said tube axis.

2. The apparatus of claim 1 wherein said actuating means includes means for moving both of said shear members relative to said single fixed pivotal support along paths diagonal to the respective elongated edges of said shear members while advancing said shear members toward each other.

3. The apparatus of claim 2 wherein said actuating means includes means opertaive to move said shear members relative to said single fixed pivotal support along paths diagonal to the respective elongated edges of said shear members in opposite directions while advancing said shear members toward each other.

4. Apparatus for severing heated tubular thermoplastic material transverse to the tube axis comprising:
a frame including four links pivotally connected end to end to form an adjustable parallelogram surrounding said tube and lying in a plane generally transverse to the axis of the tube,
means for displacing first and second opposed corners of said parallelogram toward and away from each other, said parallelogram being divided into first and second halves along an axis through said first and second opposed corners,
a pair of elongated shear members, and
means for connecting one of said shear members to the first half of said parallelogram and the other shear member to the second half of said parallelogram including fixed pivot means for connecting the said shear members to a first link in the associated half of the parallelogram and sliding pivot means for connecting the shear members to the second link in the associated half of the parallelogram whereby a shearing force is applied to said tubular thermoplastic material as the first and second opposed corners of the parallelogram are displaced from one another.

5. The apparatus of claim 4 wherein said sliding pivots include a fixed pivot on the associated second link and a slot in the associated shear member parallel to the elongated edge of the shear member for receiving the associated fixed pivot.

6. The apparatus of claim 4 wherein said first links in said first and second halves of said parallelogram are adjacent each other.

7. The apparatus of claim 6 including means for securing said first corner of the parallelogram in a fixed position with respect to the tubular thermoplastic material, and wherein said first links in said first and second halves of the parallelogram are connected to said second corner of said parallelogram which is displaced toward and away from said first corner by said displacement means.

8. The apparatus of claim 4 wherein the elongated edges of said shear members are blunt and are aligned in abutting relationship as they are advanced toward each other to effect clamping of the end of the heated tubular thermoplastic material, and wherein said one shear member carries a knife blade adjacent the elongated edge and disposed toward the elongated edge of the opposed shear member so that said knife edge overlaps the blunt edge of the opposed shear member as the shear members come together.

9. The apparatus of claim 1 wherein said actuating means includes:
linkage means for connecting said shear members diametrically opposite each other in an adjustable parallelogram, a first corner of said adjustable parallelogram between said diametrically opposed shear members being connected to said single fixed pivotal support, and
means for displacing the opposed corner of the parallelogram toward and away from said first corner thereof.

* * * * *